Aug. 23, 1960 L. FINKEL ET AL 2,950,448

TEMPERATURE COMPENSATION CIRCUIT

Filed March 27, 1957

INVENTORS
LEONARD FINKEL &
CHARLES J. WEIDKNECHT
BY Edward M. Farrell
ATTORNEY

United States Patent Office 2,950,448
Patented Aug. 23, 1960

2,950,448

TEMPERATURE COMPENSATION CIRCUIT

Leonard Finkel, Delaware Township, Camden County, N.J., and Charles J. Weidknecht, Philadelphia, Pa., assignors, by mesne assignments, to American Bosch Arma Corporation, Hempstead, N.Y., a corporation of New York Filed Mar. 27, 1957, Ser. No. 648,927
4 Claims. (Cl. 332—28)

Figure 1:
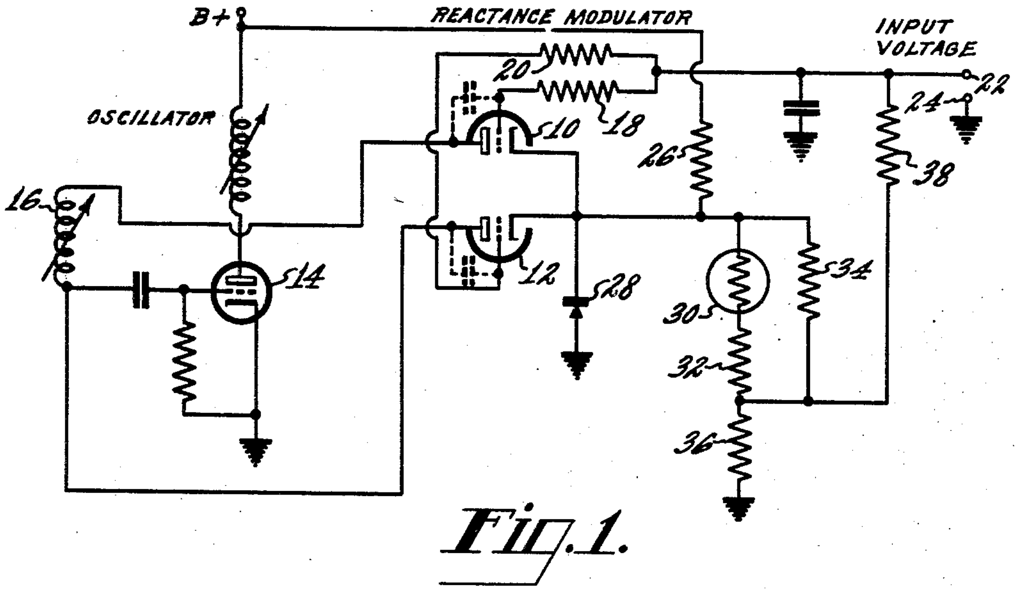

This invention relates to oscillators, and more particularly to means for compensating for the frequency drifts in such oscillators as a result of temperature variations.

In a high frequency oscillator-reactance modulator combination, it is often difficult to obtain temperature compensation of the oscillator frequency by the usual methods of selecting coil form materials or using temperature compensating capacitors. The major circuit capacities in high frequency oscillators may be of the distributed type thereby allowing only a small degree of compensation to be obtained by the use of lumped capacities of selected temperature coefficient. Coil forms must frequently be selected on the basis of high temperature and mechanical shock resistance as well as expansion coefficient, thereby restricting the temperature compensation capabilities.

It is an object of this invention to provide an improved circuit for compensating for drifts in the frequency of an oscillator resulting from changes in temperature or other environmental conditions.

In accordance with the present invention, a temperature compensation circuit is provided for frequency drifts of an oscillator. A reactance modulator is associated with the oscillator to vary its frequency in accordance with a voltage applied to the reactance modulator. A thermistor is included with means for biasing the reactance modulator. The resistance of the thermistor varies in accordance with temperature changes to provide a variable bias voltage for the reactance modulator to change the frequency of the oscillator. The variation in bias voltage is of such polarity that the reactive effect created by the reactance modulator will compensate the oscillator frequency drifts caused by variations in temperature.

Figure 2:
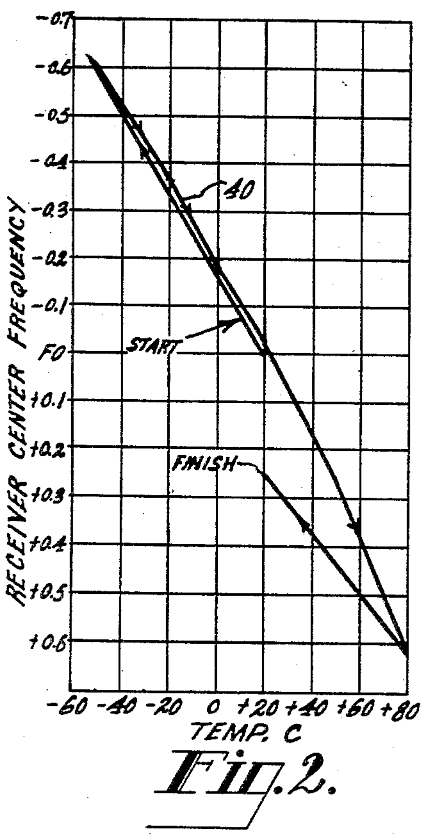
Figure 3:
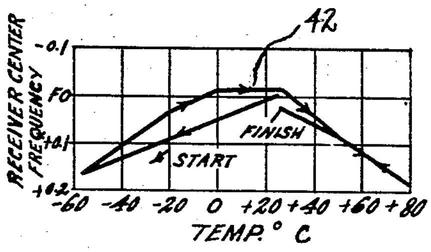

Other objects and advantages of the present invention will be apparent and suggest themselves to those skilled in the art from a reading of the following specification and claims in connection with the drawing, in which:

Figure 1 is a schematic circuit diagram illustrating a temperature compensation circuit, in accordance with the present invention;

Figure 2 is a chart illustrating the center frequency response of a receiver employing a circuit similar to the one shown in Figure 1 without the temperature compensation feature of the present invention; and, Figure 3 is a chart illustrating the center frequency response of a receiver employing a circuit, such as the one shown in Figure 1, which embodies the temperature compensation feature of the present invention.

Referring to Figure 1, a pair of reactance modulator tubes 10 and 12 are associated with a modified Colpitts oscillator circuit which includes the triode tube 14. The sum of all the interelectrode capacities plus the external elements including a variable inductance coil 16 determine the proper feedback and the proper frequency of the oscillator circuit shown. Since numerous different types of oscillators may be used with the present invention, a detailed theoretical analysis of the oscillator shown is not given.

In considering the operation of the reactance modulators, a push-pull arrangement is provided by the tubes 10 and 12. In the reactance tube 10, the anode-to-grid interelectrode capacity indicated by dotted lines and the resistor 18 form a phase shifter which feeds phase-shifted voltage from the anode to the control grid of the triode tube 10. The resistor 18 is made relatively low compared to the reactance of the anode-to-grid interelectrode capacity so that the phase of the current through the phase shifter is determined primarily by the anode-to-grid capacity and, consequently, leads the voltage at the anode. The leading current through the anode-to-grid capacity causes a voltage drop across the resistor 18 which leads the current at the anode. When this leading voltage, which is applied to the control grid is amplified by the tube 10, the anode circuit appears as a capacitive effect since the current flowing in the anode circuit is in phase with a voltage applied to the control grid.

The operation of the tube 12 is substantially similar to the operation of the tube 10. A resistor 20 and the anode-to-grid capacity of the tube 12, indicated by dotted lines, form a phase shifter. The phase of the current through the phase shifter is determined primarily by the anode-to-grid capacity and leads the anode voltage. The voltage drop across the resistor 20 leads the anode current. The leading voltage at the control grid is amplified by the tube 12. The anode circuit of the tube 12 appears as a capacitive effect since the anode current is in phase with the voltage applied to the control grid. The magnitude of the capacitive effect is controllable by varying the transconductance of the tubes 10 and 12 by means of the input voltage.

The reactance modulator tubes 10 and 12 and their associated circuitry may be considered as two capacitors connected across the inductor 16 which is part of the oscillator circuit associated with the triode tube 14. The capacitive effect provided by the reactance modulator tubes determines to great extent the frequency of the oscillator circuit. The use of two capacitors permits a greater degree of control of the frequency of the oscillator than would be possible if a single capacitor i.e. a single reactance modulator tube were used.

A single ended input is employed to the pair of reactance tubes 10 and 12. A modulating signal, which may be a D.C. voltage from a discriminator circuit, for example, or D.C. or A.C. voltages from other sources, is applied simultaneously to the control grids of the reactance modulator tubes 10 and 12 through a pair of input terminals 22 and 24. It may be seen that a modulating signal applied to the control grids of the tubes 10 and 12 causes a corresponding change in the current in the tubes and hence a change in the effective transconductance. The changes in transconductance will cause effective changes in the equivalent capacitors to thereby change the oscillator frequency.

The novel biasing arrangement for the modulator tubes 10 and 12 provided by the present invention include a resistor 26 and a diode 28 connected to B+. The voltage developed across the diode 28 is applied across a resistor-thermistor network comprising a thermistor 30 and a resistor 32 shunted by a resistor 34. A resistor 36 is connected between the resistor 32 and ground. A point intermediate the resistors 32 and 36 is connected to the control grids of the reactance modulator tubes 10 and 12 through a resistor 38.

The biasing circuit shown embodying one form of the present invention makes use of the diode 28 which acts as a voltage stabilizer. The thermistor 30 is used to vary the bias voltage on the reactance modulator tubes 10 and 12 in such a direction and magnitude as to effectively stabilize the frequency of the oscillator-modulator circuit when exposed to large temperature variations, which may be the result of changes in ambient conditions, for example.

The diode 28 maintains a stable voltage across the thermistor-resistor network so that variation in the B+ supply voltage will have a negligible effect on the compensating action. The thermistor 30 may be a semiconductor device which exhibits a large negative variation of resistance with temperature. The biasing network shown forms a temperature sensitive voltage divider which varies the bias of the reactance modulator tubes 10 and 12 with variations in temperature. By proper selection of the value of components any reasonable degree of frequency stability may be obtained.

Consider a case where a rising ambient temperature causes the oscillator frequency to increase, thereby detuning the associated receiver from the desired signal frequency. When this occurs, the resistance of the thermistor 30 decreases lowering the grid bias applied to the tubes 10 and 12 (i.e. the voltage between the grids and the cathodes) causing the reactive current in the tubes to increase. The reactive current in the circuit shown leads the oscillator tank circuit, thus making an increased reactance current appear as an increased capacitance in shunt with the oscillator tank circuit. The resonant frequency of the oscillator is, therefore, caused to decrease thereby counter-acting the rise in the oscillator frequency and detuning of the receiver caused by rise in temperature.

In a similar manner, a drop in ambient temperature may cause the oscillator frequency to decrease. In this case, the resistance of the thermistor 30 rises causing the grid bias to rise and the reactive current in the tubes 10 and 12 to decrease. The resonant frequency of the oscillator is therefore caused to rise thereby counteracting the decrease in the oscillator frequency caused by the drop in temperature.

There has thus been provided by the present invention a relatively simple circuit for compensating for frequency drifts in an oscillator caused by temperature variations. Use of special coil form materials and temperature compensating capacitors are greatly minimized by use of the novel circuit provided by the present invention.

Referring to Figure 2, there is shown a chart having a curve 40 illustrating the center frequency response of a radio receiver including a local oscillator associated with a reactance modulator. In normal telemetry receivers, for example, receivers are generally tuned to frequencies within the band between 215 and 235 megacycles. In the curve shown, the receiver center frequency $F_0$ was 235 megacycles at zero degrees centigrade. The center frequency is considered to be that frequency which, when mixed with a signal for a local oscillator will produce a signal equal to the intermediate frequency to which a receiver is tuned.

In considering the curves shown, it is noted that the local oscillator involved is designed to operate at a frequency below the incoming carrier signal. Consequently, an increase in the oscillator frequency will increase the center frequency of a receiver and a decrease in the oscillator frequency will cause a decrease in the center frequency of an associated receiver.

As the temperature was varied from zero degrees to approximately −58 degrees, the center frequency of the receiver drifted and decreased approximately 0.64 megacycle. As the temperature was varied from −58 degrees, through zero and to about +80 degrees, the center of the frequency of the receiver increased about 0.62 megacycle. As the temperature was varied to zero, the receiver became tuned to a frequency about 0.25 megacycle above $F_0$. It is seen that with such a wide variation in the center frequency of the receiver, that when a signal of 235 megacycles is applied thereto, that it may be difficult for the receiver to "capture" the incoming signal. With such wide drifts in the center frequency of the receiver, there is present the likelihood that the receiver, instead of "locking in" on the 235 megacycle signal may "lock in" on another incoming adjacent signal or channel within a telemetering band.

Referring to Figure 3, a chart having a curve 42 illustrates the frequency shift of the tuned center frequency of a radio employing the type of temperature compensation embodying the present invention such as described in connection with Figure 1. The temperature range was varied over the range from approximately −58 degrees centigrade to about +80 degrees centigrade. Despite this wide variation in temperature, which is the same variation illustrated by the chart in Figure 2, the drift in the center frequency response decreases less than .2 megacycle between temperature ranges from −58 degrees to +80 degrees. This slight drift in center frequency is well within the range to permit a receiver to "capture" or "lock in" on a 235 megacycle carrier signal when it is received.

Various other types of oscillator and reactance modulators may be employed in carrying out the present invention. The biasing arrangement which provides variable bias for a reactance modulator in accordance with temperature to compensate for oscillator frequency drifts may be in numerous forms dependent upon the degree of temperature compensation desired and other design factors.

What is claimed is:

1. In combination with an oscillator subject to frequency drifts from variations in temperature, a reactance modulator including an electron discharge device having an anode, cathode, and a control grid, means for connecting said anode to said oscillator to provide means for varying the frequency thereof, a source of operating potential, a diode voltage stabilizer and a resistor connected to said source of operating potential, a second resistor variable in accordance with temperature connected to said cathode and across said voltage stabilizer whereby the voltage across said second resistor is maintained relatively insensitive to variations in operating potential, said second resistor and said diode voltage stabilizer providing a bias potential for said reactance modulator whereby the frequency of said oscillator is varied in accordance with temperature to provide compensation for frequency drifts of said oscillator.

2. In combination with an oscillator subject to frequency drifts from variations in temperature, a reactance modulator circuit including a pair of electron discharge devices having anode and cathode circuits, means for connecting said anode circuits to said oscillator to provide means for varying the frequency thereof, a source of operating potential, a diode voltage stabilizer and a resistor connected to said source of operation potential, and a resistor network including at least one second resistor variable in accordance with temperature connected in said cathode circuits and across said diode voltage stabilizer whereby the voltage across said second resistor is maintained relatively insensitive to variations in operating potential, said resistor network and said diode voltage stabilizer providing a bias potential for said reactance modulator circuit variable in accordance with said one second resistor whereby the frequency of said oscillator is varied in accordance with temperature.

3. In combination with an oscillator subject to frequency drifts from variations in temperature, a reactance modulator circuit including a pair of electron discharge devices, means for connecting said reactance modulator circuit to said oscillator to provide means for varying the frequency thereof, a source of operating potential, a diode voltage stabilizer connected to said source of operating potential, and a resistor variable in accordance with temperature associated with said reactance modulator circuit connected across said diode whereby the voltage across said resistor is maintained relatively insensitive to variations in operating potential, said resistor and said diode voltage stabilizer providing a bias potential for said reactance modulator circuit whereby the frequency of said oscillator is varied in accordance with temperature to provide compensation for frequency drifts of said oscillator.

4. In combination with an oscillator having a tank circuit and being subject to frequency drifts from variations in temperature, a reactance modulator circuit including a pair of electron discharge devices, each of said electron discharge devices having an anode, cathode and a control grid, means for connecting said anodes across said tank circuit of said oscillator to provide means for varying the frequency thereof in accordance with the voltage applied to the control grids of said pair of electron discharge devices, a source of operating potential, a diode rectifier voltage stabilizer and a resistor connected to said source of operating potential, a resistor network including at least one second resistor variable in accordance with temperature connected to the cathodes of said pair of electron discharge devices and across said diode rectifier whereby the voltage across said second resistor is maintained relatively insensitive to variations in operating potential, said resistor network and said diode voltage stabilizer providing a bias potential for said pair of electron discharge devices whereby the frequency of said oscillator is varied in accordance with temperature to provide compensation for frequency drifts of said oscillator, and means for connecting a source of modulating signals to the control grids of said pair of electron discharge devices.

References Cited in the file of this patent

UNITED STATES PATENTS

| | | |
|---|---|---|
| 1,973,082 | Koras | Sept. 11, 1934 |
| 2,280,527 | Kimball | Apr. 21, 1942 |
| 2,367,924 | Briggs | Jan. 23, 1945 |
| 2,451,021 | Detuno | Oct. 12, 1948 |
| 2,790,147 | Armstrong et al. | Apr. 23, 1957 |
| 2,811,647 | Nilssen | Oct. 29, 1957 |